US010015264B2

(12) United States Patent
Lancaster et al.

(10) Patent No.: US 10,015,264 B2
(45) Date of Patent: Jul. 3, 2018

(54) GENERALIZED PROXY ARCHITECTURE TO PROVIDE REMOTE ACCESS TO AN APPLICATION FRAMEWORK

(71) Applicant: Calgary Scientific Inc., Calgary (CA)

(72) Inventors: Gregory Knight Lancaster, Calgary (CA); William Gregory Lancaster, Calgary (CA); Pierre Joseph Lemire, Calgary (CA)

(73) Assignee: Calgary Scientific Inc., Calgary, AB (CA)

( * ) Notice: Subject to any disclaimer, the term of this patent is extended or adjusted under 35 U.S.C. 154(b) by 303 days.

(21) Appl. No.: 14/874,519

(22) Filed: Oct. 5, 2015

(65) Prior Publication Data
US 2016/0226979 A1 Aug. 4, 2016

Related U.S. Application Data

(60) Provisional application No. 62/109,738, filed on Jan. 30, 2015.

(51) Int. Cl.
*G06F 15/16* (2006.01)
*H04L 29/08* (2006.01)

(52) U.S. Cl.
CPC .......... *H04L 67/141* (2013.01); *H04L 67/142* (2013.01); *H04L 67/2804* (2013.01)

(58) Field of Classification Search
CPC ... G06F 9/4445; H04L 67/141; H04L 67/142; H04L 67/2804
See application file for complete search history.

(56) References Cited

U.S. PATENT DOCUMENTS

| 4,975,690 A | 12/1990 | Torres |
| 5,345,550 A | 9/1994 | Bloomfield |

(Continued)

FOREIGN PATENT DOCUMENTS

| CN | 102821413 | 12/2012 |
| EP | 0349463 | 1/1990 |

(Continued)

OTHER PUBLICATIONS

"GTK 3, Broadway and an HTML5 websocket gui, for free". Published Apr. 12, 2014; accessed Sep. 26, 2017. <http://compsci.ca/v3/viewtopic.php?t=36823>. pp. 1-3.*

(Continued)

*Primary Examiner* — Christopher Biagini
(74) *Attorney, Agent, or Firm* — Meunier Carlin & Curfman LLC

(57) ABSTRACT

Systems and method for providing remote access to service applications created within an application framework. For each of the controls in the application framework, a wrapper is provided to enable remote-access to the control. An integration component includes proxies that communicate to each the rapper, a proxy manager that communicates to the service application, and a state manager that registers views and event handlers to communicate application state information. A remote access server application receives a connection from a client remote access application executing on the client device, and state information is communicated between the service application and the client remote access application to provide a view of the service application at the client device.

20 Claims, 11 Drawing Sheets

(56) References Cited

U.S. PATENT DOCUMENTS

| | | | |
|---|---|---|---|
| 5,491,800 A * | 2/1996 | Goldsmith | G06F 9/465 709/203 |
| 5,555,003 A | 9/1996 | Montgomery et al. | |
| 5,742,778 A | 4/1998 | Hao et al. | |
| 5,844,553 A | 12/1998 | Hao et al. | |
| 5,870,759 A | 2/1999 | Bauer et al. | |
| 5,903,725 A * | 5/1999 | Colyer | G06F 9/548 709/203 |
| 5,920,311 A | 7/1999 | Anthias | |
| 5,978,842 A | 11/1999 | Noble et al. | |
| 6,045,048 A | 4/2000 | Wilz et al. | |
| 6,061,689 A | 5/2000 | Chang et al. | |
| 6,075,531 A | 6/2000 | DeStefano | |
| 6,141,698 A | 10/2000 | Krishnan et al. | |
| 6,145,098 A | 11/2000 | Nouri et al. | |
| 6,253,228 B1 | 6/2001 | Ferris et al. | |
| 6,343,313 B1 | 1/2002 | Salesky et al. | |
| 6,453,334 B1 | 9/2002 | Vinson et al. | |
| 6,453,356 B1 | 9/2002 | Sheard et al. | |
| 6,570,563 B1 | 5/2003 | Honda | |
| 6,601,233 B1 | 7/2003 | Underwood | |
| 6,792,607 B1 | 9/2004 | Burd et al. | |
| 6,909,545 B2 | 6/2005 | Takano et al. | |
| 6,918,113 B2 | 7/2005 | Patel et al. | |
| 6,938,096 B1 | 8/2005 | Greschler et al. | |
| 6,976,077 B1 | 12/2005 | Lehew et al. | |
| 7,065,568 B2 | 6/2006 | Bracewell et al. | |
| 7,069,227 B1 | 6/2006 | Lintel, III et al. | |
| 7,073,059 B2 | 7/2006 | Worely et al. | |
| 7,149,761 B2 | 12/2006 | Cooke et al. | |
| 7,167,893 B1 | 1/2007 | Malone et al. | |
| 7,174,504 B2 | 2/2007 | Tsao | |
| 7,181,686 B1 | 2/2007 | Bahrs | |
| 7,240,162 B2 | 7/2007 | de Vries | |
| 7,246,063 B2 | 7/2007 | James et al. | |
| 7,343,310 B1 | 3/2008 | Stender | |
| 7,350,151 B1 | 3/2008 | Nakajima | |
| 7,418,711 B1 | 8/2008 | Lee et al. | |
| 7,451,196 B1 | 11/2008 | de Vries et al. | |
| 7,577,751 B2 | 8/2009 | Vinson et al. | |
| 7,620,901 B2 | 11/2009 | Carpenter et al. | |
| 7,647,370 B1 | 1/2010 | Liu et al. | |
| 7,650,444 B2 | 1/2010 | Dirstine et al. | |
| 7,656,799 B2 | 2/2010 | Samuels et al. | |
| 7,706,399 B2 | 4/2010 | Janczak | |
| 7,725,331 B2 | 5/2010 | Schurenberg et al. | |
| 7,802,183 B1 | 9/2010 | Essin | |
| 7,831,919 B1 | 11/2010 | Viljoen et al. | |
| 7,921,078 B2 | 4/2011 | McCuller | |
| 7,941,488 B2 | 5/2011 | Goodman et al. | |
| 7,966,572 B2 | 6/2011 | Matthews et al. | |
| 8,024,523 B2 | 9/2011 | de Vries et al. | |
| 8,261,345 B2 | 9/2012 | Hitomi et al. | |
| 8,356,252 B2 | 1/2013 | Raman et al. | |
| 8,359,591 B2 | 1/2013 | de Vries et al. | |
| 8,509,230 B2 | 8/2013 | Vinson et al. | |
| 8,527,706 B2 | 9/2013 | de Vries et al. | |
| 8,572,178 B1 | 10/2013 | Frazzini et al. | |
| 8,606,952 B2 | 12/2013 | Pasetto et al. | |
| 8,607,158 B2 | 12/2013 | Molander et al. | |
| 8,627,081 B2 | 1/2014 | Grimen et al. | |
| 8,667,054 B2 | 3/2014 | Tahan | |
| 8,832,260 B2 | 9/2014 | Raja et al. | |
| 8,910,112 B2 * | 12/2014 | Li | G06F 8/36 709/227 |
| 8,924,512 B2 | 12/2014 | Stoyanov et al. | |
| 9,239,812 B1 * | 1/2016 | Berlin | G06F 15/16 |
| 2001/0033299 A1 * | 10/2001 | Callaway | G06F 9/4433 715/763 |
| 2001/0047393 A1 | 11/2001 | Arner et al. | |
| 2002/0032751 A1 | 3/2002 | Bharadwaj | |
| 2002/0032783 A1 * | 3/2002 | Tuatini | H04L 67/16 709/229 |
| 2002/0032804 A1 | 3/2002 | Hunt | |
| 2002/0092029 A1 | 7/2002 | Smith | |
| 2003/0014735 A1 | 1/2003 | Achlioptas et al. | |
| 2003/0023670 A1 | 1/2003 | Walrath | |
| 2003/0065738 A1 | 4/2003 | Yang et al. | |
| 2003/0120324 A1 | 6/2003 | Osborn et al. | |
| 2003/0120762 A1 | 6/2003 | Yepishin et al. | |
| 2003/0149941 A1 | 8/2003 | Tsao | |
| 2003/0163514 A1 | 8/2003 | Waldschmidt | |
| 2003/0184584 A1 | 10/2003 | Vachuska et al. | |
| 2003/0208472 A1 | 11/2003 | Pham | |
| 2004/0015842 A1 | 1/2004 | Nanivadekar et al. | |
| 2004/0029638 A1 | 2/2004 | Hytcheson et al. | |
| 2004/0039742 A1 | 2/2004 | Barsness et al. | |
| 2004/0068516 A1 | 4/2004 | Lee et al. | |
| 2004/0106916 A1 | 6/2004 | Quaid et al. | |
| 2004/0117804 A1 | 6/2004 | Scahill et al. | |
| 2004/0162876 A1 | 8/2004 | Kohavi | |
| 2004/0183827 A1 | 9/2004 | Putterman et al. | |
| 2004/0236633 A1 | 11/2004 | Knauerhase et al. | |
| 2004/0243919 A1 | 12/2004 | Muresan et al. | |
| 2004/0249885 A1 | 12/2004 | Petropoulakis et al. | |
| 2005/0005024 A1 | 1/2005 | Samuels et al. | |
| 2005/0010871 A1 | 1/2005 | Ruthfield et al. | |
| 2005/0021687 A1 | 1/2005 | Anastassopoulos et al. | |
| 2005/0050229 A1 | 3/2005 | Comeau et al. | |
| 2005/0138631 A1 | 6/2005 | Bellotti et al. | |
| 2005/0188046 A1 | 8/2005 | Hickman et al. | |
| 2005/0188313 A1 | 8/2005 | Matthews et al. | |
| 2005/0240906 A1 | 10/2005 | Kinderknecht et al. | |
| 2006/0004874 A1 | 1/2006 | Hutcheson et al. | |
| 2006/0026006 A1 | 2/2006 | Hindle | |
| 2006/0031377 A1 | 2/2006 | Ng et al. | |
| 2006/0031481 A1 * | 2/2006 | Patrick | G06F 11/0772 709/224 |
| 2006/0036770 A1 | 2/2006 | Hosn et al. | |
| 2006/0101397 A1 | 5/2006 | Mercer et al. | |
| 2006/0130069 A1 | 6/2006 | Srinivasan et al. | |
| 2006/0231175 A1 | 10/2006 | Vondracek et al. | |
| 2006/0236328 A1 | 10/2006 | DeWitt | |
| 2006/0258462 A1 | 11/2006 | Cheng et al. | |
| 2006/0265689 A1 | 11/2006 | Kuznetsov et al. | |
| 2006/0271563 A1 | 11/2006 | Angelo et al. | |
| 2006/0288171 A1 | 12/2006 | Tsien | |
| 2006/0294418 A1 | 12/2006 | Fuchs | |
| 2007/0024645 A1 | 2/2007 | Purcell et al. | |
| 2007/0047535 A1 | 3/2007 | Varma | |
| 2007/0067754 A1 | 3/2007 | Chen et al. | |
| 2007/0079244 A1 | 4/2007 | Brugiolo | |
| 2007/0112880 A1 | 5/2007 | Yang et al. | |
| 2007/0120763 A1 | 5/2007 | De Paepe et al. | |
| 2007/0130292 A1 | 6/2007 | Tzruya et al. | |
| 2007/0136677 A1 | 6/2007 | Agarwal | |
| 2007/0203944 A1 | 8/2007 | Batra et al. | |
| 2007/0208718 A1 | 9/2007 | Javid et al. | |
| 2007/0226636 A1 | 9/2007 | Carpenter et al. | |
| 2007/0244990 A1 | 10/2007 | Wells | |
| 2007/0256073 A1 | 11/2007 | Truong et al. | |
| 2007/0282951 A1 | 12/2007 | Selimis et al. | |
| 2008/0134211 A1 | 6/2008 | Cui | |
| 2008/0146194 A1 | 6/2008 | Yang et al. | |
| 2008/0183190 A1 | 7/2008 | Adcox et al. | |
| 2008/0313282 A1 | 12/2008 | Warila et al. | |
| 2009/0044171 A1 | 2/2009 | Avadhanula | |
| 2009/0080523 A1 | 3/2009 | McDowell | |
| 2009/0089742 A1 | 4/2009 | Nagulu et al. | |
| 2009/0119644 A1 | 5/2009 | de Vries et al. | |
| 2009/0209239 A1 | 8/2009 | Montesdeoca | |
| 2009/0217177 A1 | 8/2009 | DeGrazia | |
| 2009/0328032 A1 * | 12/2009 | Crow | G06F 8/52 717/176 |
| 2010/0061238 A1 | 3/2010 | Godbole et al. | |
| 2010/0077058 A1 | 3/2010 | Messer | |
| 2010/0131591 A1 | 5/2010 | Thomas et al. | |
| 2010/0150031 A1 | 6/2010 | Allen et al. | |
| 2010/0174773 A1 | 7/2010 | Penner et al. | |
| 2010/0205147 A1 | 8/2010 | Lee | |
| 2010/0223566 A1 | 9/2010 | Holmes et al. | |
| 2010/0268813 A1 | 10/2010 | Pahlavan et al. | |
| 2011/0138283 A1 | 6/2011 | Marston | |

(56) References Cited

U.S. PATENT DOCUMENTS

| | | |
|---|---|---|
| 2011/0157196 A1 | 6/2011 | Nave et al. |
| 2011/0162062 A1 | 6/2011 | Kumar et al. |
| 2011/0184993 A1 | 7/2011 | Chawla et al. |
| 2011/0213830 A1 | 9/2011 | Lopez et al. |
| 2011/0222442 A1 | 9/2011 | Cole et al. |
| 2012/0030275 A1 | 2/2012 | Boller et al. |
| 2012/0084713 A1 | 4/2012 | Desai et al. |
| 2012/0090004 A1 | 4/2012 | Jeong |
| 2012/0133675 A1 | 5/2012 | McDowell |
| 2012/0151373 A1* | 6/2012 | Kominac .......... G06F 17/30905 715/740 |
| 2012/0154633 A1 | 6/2012 | Rodriguez |
| 2012/0221792 A1 | 8/2012 | de Vries et al. |
| 2012/0226742 A1 | 9/2012 | Momchilov et al. |
| 2012/0245918 A1 | 9/2012 | Overton et al. |
| 2012/0246225 A1 | 9/2012 | Lemire et al. |
| 2012/0296959 A1* | 11/2012 | Momchilov ............... G06F 9/54 709/203 |
| 2012/0324032 A1 | 12/2012 | Chan |
| 2013/0007227 A1 | 1/2013 | Hitomi et al. |
| 2013/0031618 A1 | 1/2013 | Momchilov |
| 2013/0046815 A1 | 2/2013 | Thomas et al. |
| 2013/0046816 A1 | 2/2013 | Thomas et al. |
| 2013/0054679 A1 | 2/2013 | Jooste |
| 2013/0070740 A1 | 3/2013 | Yovin |
| 2013/0113833 A1* | 5/2013 | Larsson ................ H04L 67/08 345/642 |
| 2013/0117474 A1 | 5/2013 | Ajanovic et al. |
| 2013/0138791 A1 | 5/2013 | Thomas et al. |
| 2013/0147845 A1 | 6/2013 | Xie et al. |
| 2013/0159062 A1 | 6/2013 | Stiehl |
| 2013/0179962 A1 | 7/2013 | Arai et al. |
| 2013/0262566 A1 | 10/2013 | Stephure et al. |
| 2013/0290408 A1 | 10/2013 | Stephure et al. |
| 2013/0290856 A1* | 10/2013 | Beveridge ............. G06F 9/4445 715/740 |
| 2013/0346482 A1 | 12/2013 | Holmes |
| 2014/0240524 A1 | 8/2014 | Julia et al. |
| 2014/0298420 A1 | 10/2014 | Barton et al. |
| 2015/0067035 A1* | 3/2015 | Sullad ................... H04L 67/08 709/203 |
| 2015/0067769 A1 | 3/2015 | Barton et al. |
| 2015/0081764 A1* | 3/2015 | Zhao ...................... H04L 67/08 709/203 |
| 2015/0156133 A1 | 6/2015 | Leitch et al. |
| 2015/0163292 A1 | 6/2015 | Lemire et al. |
| 2015/0319252 A1 | 11/2015 | Momchilov et al. |
| 2016/0054897 A1 | 2/2016 | Holmes et al. |

FOREIGN PATENT DOCUMENTS

| | | |
|---|---|---|
| EP | 1422901 | 5/2004 |
| JP | 2007/084744 | 3/1995 |
| JP | 2002/055870 | 2/2002 |
| JP | 2004-287758 | 10/2004 |
| JP | 2005/031807 | 2/2005 |
| JP | 2005/521946 | 7/2005 |
| JP | 2008-099055 | 4/2008 |
| JP | 4405812 | 1/2010 |
| JP | 2010-256972 | 11/2010 |
| RU | 2295752 | 3/2007 |
| RU | 2298287 | 4/2007 |
| RU | 2305860 | 9/2007 |
| WO | 1998/058478 | 12/1998 |
| WO | 2001/016724 | 3/2001 |
| WO | 2002/009106 | 1/2002 |
| WO | 2003/032569 | 4/2003 |
| WO | 2003/083684 | 10/2003 |
| WO | 2010/060206 | 6/2010 |
| WO | 2010/088768 | 8/2010 |
| WO | 2010/127327 | 11/2010 |
| WO | 2012/127308 | 9/2012 |
| WO | 2013/024342 | 2/2013 |
| WO | 2013/024343 | 2/2013 |
| WO | 2013/109984 | 7/2013 |
| WO | 2013/128284 | 9/2013 |
| WO | 2013/153439 | 10/2013 |
| WO | 2015/080845 | 6/2015 |

OTHER PUBLICATIONS

International Search Report and Written Opinion, dated Jun. 30, 2016, received in connection International Patent Application No. PCT/IB2016/000277.

Coffman, Daniel, et al., "A Client-Server Architecture for State-Dependent Dynamic Visualizations on the Web," IBM T.J. Watson Research Center, 2010, 10 pages.

Fraser, N., "Differential Synchronization," Google, Mountain View, CA, Jan. 2009, 8 pages.

Jourdain, Sebastien, et al., "ParaViewWeb: A Web Framework for 3D Visualization and Data Processing," International Journal of Computer Information Systems and Industrial Management Applications, vol. 3, 2011, pp. 870-877.

Microsoft Computer Dictionary, Microsoft Press, $5^{th}$ Edition, Mar. 15, 2002, p. 624.

Mitchell, J. Ross, et al., A Smartphone Client-Server Teleradiology System for Primary Diagnosis of Acute Stroke, Journal of Medical Internet Research, vol. 13, Issue 2, 2011, 12 pages.

ParaViewWeb, KitwarePublic, retrieved on Jan. 27, 2014 from http://www.paraview.org/Wiki/ParaViewWeb, 1 page.

Remote Desktop Protocol (RDP), retrieved on May 4, 2014 from http://en.wikipedia.org/wiki/Remote_Desktop_Protocol, 7 pages.

Remote Desktop Services (RDS), Remote App, retrieved on May 4, 2014 from http://en.wikipedia.org/wiki/Remote_Desktop_Services, 9 pages.

Remote Desktop Services (RDS), Windows Desktop Sharing, retrieved on May 4, 2014 from http://en.wikipedia.org/wiki/Remote_Desktop_Services, 9 pages.

European Search Report, dated Sep. 29, 2015, received in connection with related European Application No. 12824363.1.

European Search Report, dated Sep. 1, 2015, received in connection with related European Application No. 12824077.7.

European Search Report, dated Mar. 3, 2015, received in connection with related European Application No. 09828497.9.

European Search Report, dated Jun. 2, 2014, received in connection with European Application No. 12760310.8.

European Search Report, dated Jul. 5, 2012, received in connection with European Application No. 10738183.2.

International Search Report, dated Feb. 19, 2010, received in connection with International Patent Application No. PCT/CA2009/001704.

International Preliminary Report on Patentability and Written Opinion, dated May 31, 2011, received in connection with International Patent Application No. PCT/CA2009/001704.

International Search Report, dated May 12, 2010, received in connection with International Patent Application No. PCT/CA2010/000154.

International Preliminary Report on Patentability and Written Opinion, dated Aug. 9, 2011, received in connection with International Patent Application No. PCT/CA2010/000154.

International Search Report and Written Opinion, dated Jul. 31, 2012, received in connection with International Patent Application No. PCT/IB2012/000562.

International Preliminary Report on Patentability and Written Opinion, dated Sep. 24, 2013, received in connection with International Patent Application No. PCT/CA2010/000562.

International Search Report, dated Dec. 20, 2012, received in connection with International Patent Application No. PCT/IB2012/001589.

International Preliminary Report on Patentability and Written Opinion, dated Feb. 18, 2014, received in connection with International Patent Application No. PCT/IB2012/001589.

International Search Report, dated Dec. 28, 2012, received in connection with International Patent Application No. PCT/IB2012/001590.

(56) References Cited

OTHER PUBLICATIONS

International Preliminary Report on Patentability and Written Opinion, dated Feb. 18, 2014, received in connection with International Patent Application No. PCT/IB2012/001590.

International Search Report and Written Opinion, dated Aug. 21, 2013, received in connection with International Patent Application No. PCT/IB2013/000676.

International Preliminary Report on Patentability and Written Opinion, dated Oct. 14, 2014, received in connection with International Patent Application No. PCT/CA2010/000676.

International Search Report and Written Opinion, dated Jul. 31, 2013, received in connection with International Patent Application No. PCT/IB2013/000720.

International Preliminary Report on Patentability and Written Opinion, dated Sep. 2, 2014, received in connection with International Patent Application No. PCT/CA2010/000720.

International Search Report and Written Opinion, dated Mar. 19, 2015, received in connection with International Patent Application No. PCT/US2014/064243.

Search Report and Written Opinion, dated Nov. 16, 2015, received in connection with SG Application No. 2013087150.

International Preliminary Report on Patentability and Written Opinion, dated May 31, 2016, received in connection International Patent Application No. PCT/US2014/064243.

* cited by examiner

GENERALIZED PROXY ARCHITECTURE TO PROVIDE REMOTE ACCESS TO AN APPLICATION FRAMEWORK

CROSS-REFERENCE TO RELATED APPLICATION

This application claims priority to U.S. Provisional Patent Application No. 62/109,738, filed Jan. 30, 2015, entitled "Generalized Proxy Architecture to Provide Remote Access to an Application Framework," which is incorporated by reference in its entirety.

BACKGROUND

Application frameworks, such as Qt, .Net, the Microsoft Foundation Class (MFC), provide a software development framework that is used to create applications that implement a standard structure. The application frameworks also provide for cross-platform deployment on different operating systems. Some application frameworks, such as Qt, may be used to create graphical user interfaces (GUIs) through the use of widgets. The GUI may be used to define the underlying code structure of the application. Typically, object-oriented programming techniques (e.g., C++) are used to implement the application frameworks such that parts of an application can inherit from pre-existing classes in the framework.

BACKGROUND

Application frameworks, such as Qt, .Net, the Microsoft Foundation Class (MFC), provide a software development framework that is used to create applications that implement a standard structure. The application frameworks also provide for cross-platform deployment on different operating systems. Some application frameworks, such as Qt, may be used to create graphical user interfaces (GUIs) through the use of widgets. The GUI may be used to define the underlying code structure of the application. Typically, object-oriented programming techniques (e.g., C++) are used to implement the application frameworks such that parts of an application can inherit from pre-existing classes in the framework.

However, while application frameworks have greatly enhanced application development, the application frameworks are not designed to provide remote access to the applications developed thereon. As such, a user cannot remotely access an application built on an application framework, nor can multiple users collaboratively interact with an application built on an application framework.

SUMMARY

Disclosed herein are systems and methods for providing remote access to a service application within in an application framework executing on a server. An example method may include providing wrappers that each correspond to a control of the application framework, each wrapper modifying an interface of a respective control to enable remote-access to the respective control; providing an integration component that includes proxies that communicate to the wrappers, a proxy manager that communicates to the service application, and a state manager that registers views and event handlers to communicate application state information; starting a remote access server application on a remote access server in accordance with an identifier provided by the proxy manager to enable remote access to the service application; receiving a connection from a client remote access application executing on a client device; and communicating state information between the service application and the client remote access application to provide a view of the service application at the client device Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described for remotely accessing applications, it will become evident to those skilled in the art that the implementations are not limited thereto, but are applicable for remotely accessing any type of data or service via a remote device.

Introduction

The present disclosure is directed to systems and methods to quickly adapt desktop applications built on application frameworks, such as Qt (available from Digia), .Net, the Microsoft Foundation Class (MFC) (each available from Microsoft Corporation), and wxWidgets, for use on the World Wide Web (the Web) and on mobile platforms. As will be described below, example implementations using Qt will be described; however, the implementations herein may be extended to other application frameworks. The present disclosure provides a set of Remote-access/Qt widgets and associated proxies that pre-integrate existing Qt APIs with a remote access server application, such as PUREWEB available from Calgary Scientific Inc., Alberta, Canada. These widgets provide an easy methodology to provide remote access capabilities an application. For example, a developer may simply substitute the prefix of the Remote-access/Qt widget for the original widget into the software code. The complexity of the system is abstracted by the Remote-access/Qt widgets such that the application developers only need a limited knowledge of PUREWEB. Thus, the Remote-access/Qt widgets provide a rapid transformation methodology for desktop applications using the Qt Framework to migrate to Web and Mobile services and clients.

Basic Architecture

Figure 1:
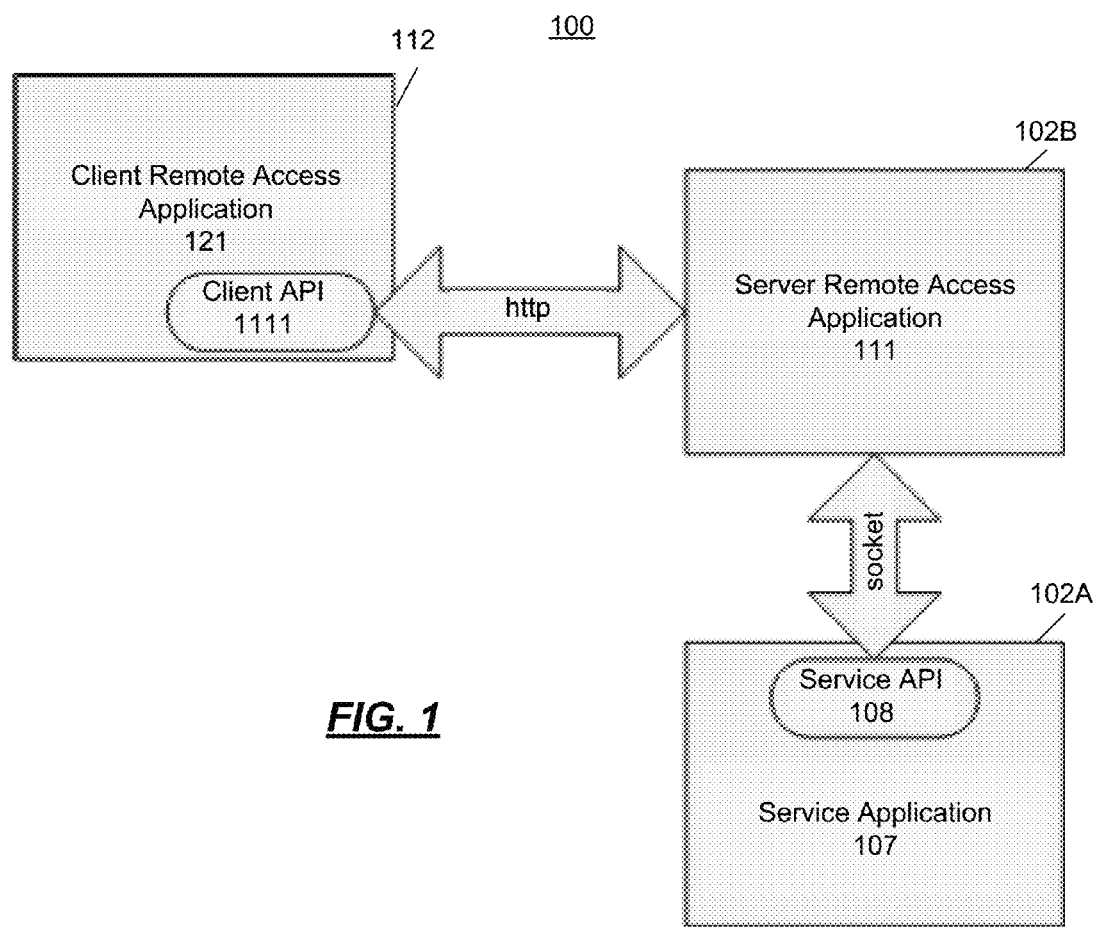
FIG. 1 is a simplified block diagram illustrating a system for providing remote access to an application at a remote device via a computer network.

FIG. 1 illustrates a high level overview of a remote access architecture 100. As illustrated, the remote access architecture 100 of the present disclosure may comprise three tiers—a client remote access application 121 executing on a client computer 112, a remote access server application 111 executing on a server 102B and a service application 107 executing on a server 102A (or alternatively on the server 102B). The service application 107 contains application logic and uses a Service API 108 to "plug-in" to the remote access server application 111, maintain application state, and generate rendered views.

The remote access server application 111 is responsible for starting and stopping services and mediating communication between client remote access applications 121 and service applications 107.

As will be described below, the client remote access application 121 allows users to interact with services (e.g., service applications 107) through web browsers and/or mobile devices. In the context of the present disclosure, to remote-access enable an existing application means to transform a desktop/workstation version of an application into a service application 107 by creating objects and calling methods from the Service API 108. Specifically, as will be described in more detail with reference to FIGS. 4A and 4B, the application service 107 will create a singleton instance of StateManager and pass it to a singleton instance of StateManagerServer associated with the remote access server application 111. The StateManagerServer handles communication with the remote access server application 111 over standard input and output streams.

Figure 8:
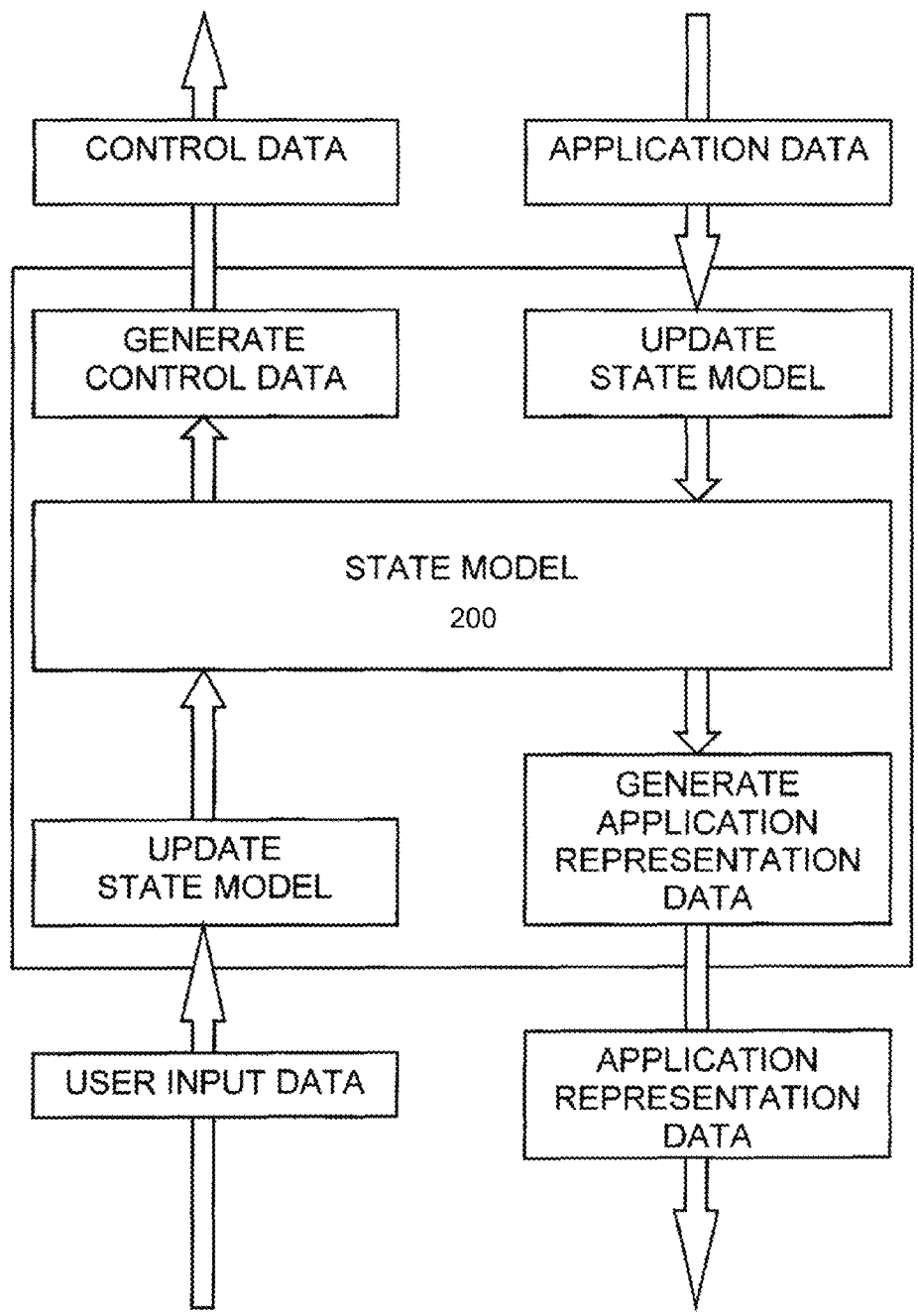
FIG. 8 is a state model in accordance with the present disclosure.
Figure 9:
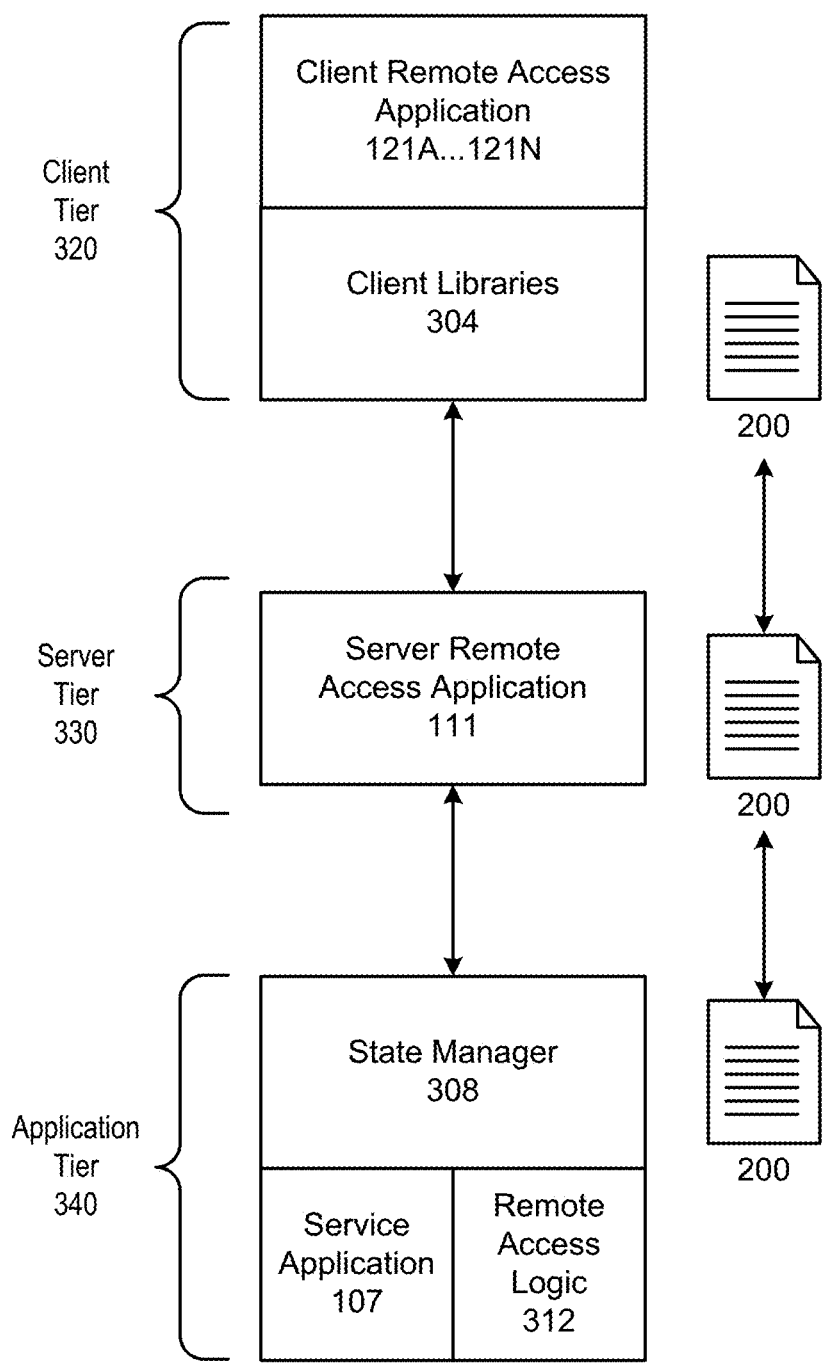
FIG. 9 illustrates aspects of the distributed system as applied to the system of FIG. 7.

Messages arriving from the client remote access application 121 at the service application 107 are passed via the remote access server application 111, and as communicated as, e.g., XML text in a state model (see, FIGS. 8 and 9). The content of XML text is converted to lists of command objects that are executed by the StateManager. For example, these include commands to change the application state, commands that represent user input events, and custom commands understood by the service application 107.

In executing the commands the service application 107 will generate response objects including changes to the application state and new rendered images. The StateManagerServer converts the response objects to XML text messages that are passed back to the client remote access application 121 via the remote access server application 111.

In some implementations, the remote access server application 111 may be implemented as an Apache Tomcat web server and a set of libraries for developing services and clients. Integrating remote access libraries into a desktop application transforms it into a Web service that plugs into the remote access server. In other implementations, for desktop applications written using Qt, the applications can be transformed into a service that works with the remote access server application using just a few lines of code. Client libraries are provided for Web and Mobile platforms, such as: iOS, Android, Java Swing, Microsoft Silverlight, Adobe Flash, and HTML5. As will be described, remote clients receive user inputs and manage state (using the state model) with the service application that may be running on a remote access server or an application server in communication with the remote access server. Thus, the present disclosure provides for an architecture where logic and data do not reside on the client, rather data resides, and processing is performed, on the remote access server and/or the application server. As such, remotely accessible high performance and secure computing is provided.

As will be described below, remote-access integration is achieved by transparently replacing Qt widgets with corresponding 'remote-access-enabled' Qt widgets. These remote-access-enabled Qt widgets look and behave just like their standard Qt counterparts, but with the additional capability to transfer state/views and intercept/inject events via the remote access server application 111.

Application Frameworks and Remote Access Integration

Implementations of an architecture that provides remote access to an application via its underlying application framework will now be described. In accordance with the present disclosure, remote access and collaboration may be provided to a, e.g., an application framework by replacing low-level widgets and layouts (e.g., UI elements) with corresponding remote-access-enabled widgets and layouts. The remote-access-enabled widgets and layouts support the interface and all standard behaviors of their conventional counterparts, but also extend them with a 'tap' functionality (described below) that allows monitoring and/or injection of state information and events. The taps allow a widget or layout to be programmatically monitored and controlled, making it 'remote-access-ready'.

As used herein, a fully-implemented framework supporting this architecture includes taps for most, if not all, of the standard application framework widgets, is collectively termed "an integration component" (reference numeral 506 in the FIGS). An intermediate layer of dynamically-constructed integration proxies is then used to mediate communications between the taps and the remote access server application 111, decoupling the application from remote access server application 111.

Application frameworks may support a hierarchically-structured UI paradigm supporting the concept of navigable parent/child relationships between widgets (controls and views), along with development tools which support automation and dependable systematic structure for UI creation. Specifically, some application frameworks support a rich object model including runtime type and metadata introspection and runtime object interconnection/communications (signals and slots). Any class derived from a base class of objects automatically gains access to all these mechanisms and many more (standard container types, image and I/O handling, etc.).

For remote access integration, in some application frameworks, the signals/slots communications mechanism enables runtime integration of remote access capabilities without requiring compile-time linkage and source dependencies. UI widgets use signals and slots as their underlying interconnection mechanism, allowing events (signals) generated by controls to be bound to recipients (slots) at runtime. This same mechanism may be used to signal events across component boundaries at runtime without requiring explicit linking of the components. This provides the opportunity for the remote access integration mechanism of the present disclosure to subscribe to events generated by the UI elements, and gain access to UI inputs without requiring explicit linkage. Likewise, events may be 'injected' into control hierarchies without explicit linkage.

Figure 2:
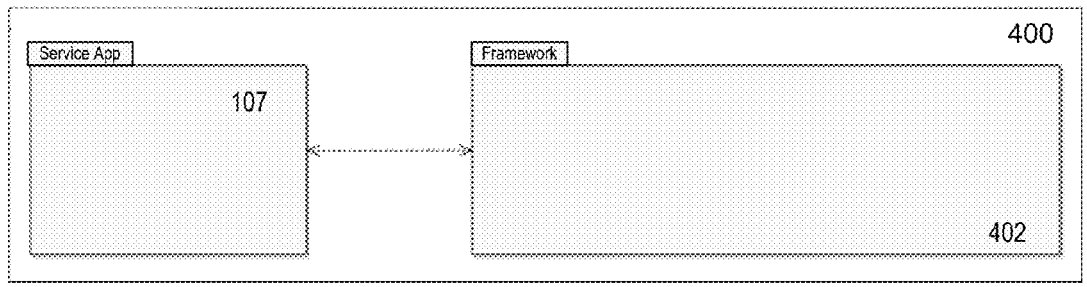
FIG. 2 illustrates a service application and its original interaction with an application framework.

FIG. 2 illustrates an architecture 400 including a service application and its conventional interaction with an application and user interface framework. As illustrated, the service application 107 calls directly to a framework 402 to create UI elements from, e.g., widgets, controls, and layouts. For example, the framework 402 may include libraries of low level controls that provide user interface functionalities, such as menus, text boxes, progress bars, slider controls, etc.

Figure 3:
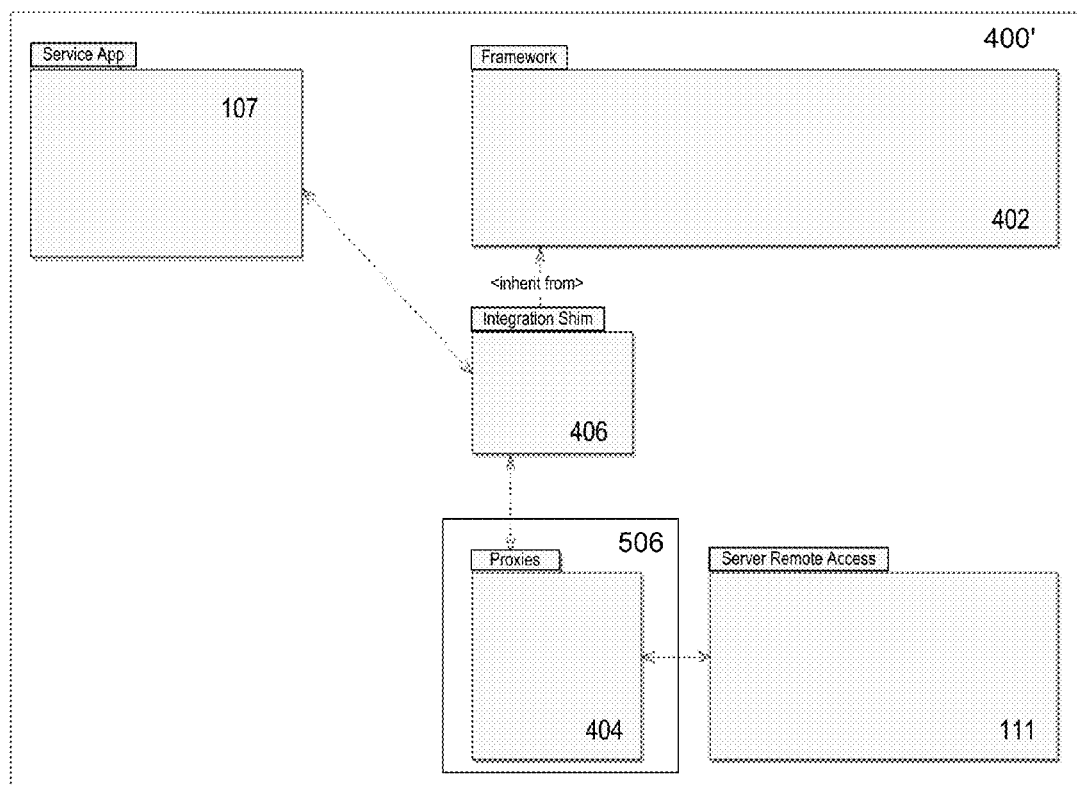
FIG. 3 illustrates a high-level overview of the service application of FIG. 2 when remote-access enabled in accordance with present disclosure.

FIG. 3 illustrates an architecture 400' including the service application of FIG. 2 when "remote-access-enabled" in accordance with present disclosure. As illustrated, the service application 107 communicates with an integration shim (wrapper component) 406, which includes "taps," which are wrappers around a respective object in the service application 107, typically a UI control. The taps are capable of injecting and intercepting events and state to/from the object (e.g., the UI control). Each tap in turn communicates with the remote access server application 111 via an associated proxy object which conveys all the event/state information relevant to the tap. The events and state information may be used by the client remote access application 121 to interact with and display representations of the app-side UI controls. The tap is capable of injecting events on the object (e.g., activate a 'click' method on a button object) or intercept/monitor events generated by the object (e.g., recognize when the 'clicked' event/method occurs on a button object, and perform some action as a consequence).

Wrapping is typically achieved by inheritance, e.g., a new Tap_Button wrapper class is derived from the Button class, and the event methods are overloaded to allow injected or intercepted events to be communicated from or to another object (e.g., the Proxy). The application is then modified to use a Tap_Button in all the places it formerly used a Button. It is noted that other wrapping mechanisms may be used, such as, wrapping via containment where a Tap_Button class could contain a Button instance, and forward all calls to or from that object. While this allows complete control over the Button's environment and perception of the 'the outside world', it may involve dozens or even hundreds of trivial forwarding methods in the wrapping class, significantly increasing code size and maintenance overhead.

An integration component 506 includes a collection of dynamically-created integration proxies 404 which connect application-side objects to the remote access server application 111. The Integration component 506 communicates with integration proxy objects 404, that in turn, communications with the remote access server application 111. In some implementations, the integration component 506 may be integrated into the remote access server application 111. Each proxy object is a conduit which conveys events and state between an associated tap object and the client remote access application 121 (via remote access server application 111). The proxy may perform such functions as obtaining StateManager and CommandManager references, binding client-issued commands to event notification calls destined for the tap, and manipulating the application state to reflect any state information shared between the client remote access application 121 and the tap using application state paths structured according to knowledge of the tap's identity (e.g., a position in the 'visual tree' relative to other controls).

In accordance with some aspects, there may be more tap types than proxy types, as a single proxy type may be able to communicate all the event/state information needed by a number of tap types (e.g., a single abstract 'Button Proxy' can convey all the click, label, visibility, and other state information needed by a wide range of button types in a UI framework). As such, a tap knows what type of proxy it can communicate through, and the proxy need not know about tap types (other than that the tap supports the event injection and state update methods the proxy may call).

When a tap object is created, it creates a corresponding proxy object of the required type, and when the tap object is destroyed the proxy is destroyed. Thus, given that the tap objects are typically (derived) instances of app-side UI controls, this gives a clean lifetime control mechanism for proxies and reduces the likelihood of memory leaks or leftover instances. In order to instantiate a proxy of a specific required type (i.e., the tap class), a factory mechanism may be used. For example, this could be a runtime mechanism such as a map of type strings to factory objects where a factory can create an instance of the specified proxy type, or a compile-time mechanism utilizing a templated/generic factory class to create instances of proxies whose type is provided by a typedef known to the tap. The former mechanism may be useful in cases where the implementation technologies for taps and proxies are very different, whereas the latter template mechanism provides for error checking at compile time rather than at runtime.

Using a tap/proxy mechanism such as described above, the present disclosure provides for a mechanism to remote-access enable an application very quickly by replacing occurrences of native UI control types in the application code with corresponding tap types. The taps will behave like the original native UI control types, but convey information about events and control state to/from proxies, and thus remote clients. A generalized version of the tap/proxy framework in the architecture 400' thus provides for low impact on the original service application (i.e., only minimal source code changes are need to remote access enable the service application); componentization (i.e., it is possible to update a shared component or library such that it is remote access enabled, but still functions normally in the absence of the remote access server application 111); ease of maintenance; reusability; UI Framework adaptability (i.e., the architecture 400' may be used in a wide range of application frameworks; and UI abstraction/client adaptability (i.e., the ability to utilize clients which do not have exactly the same UI controls as a service application, or to remote only portions of a service application's UI.

Detailed Example Implementation

Figure 4A:
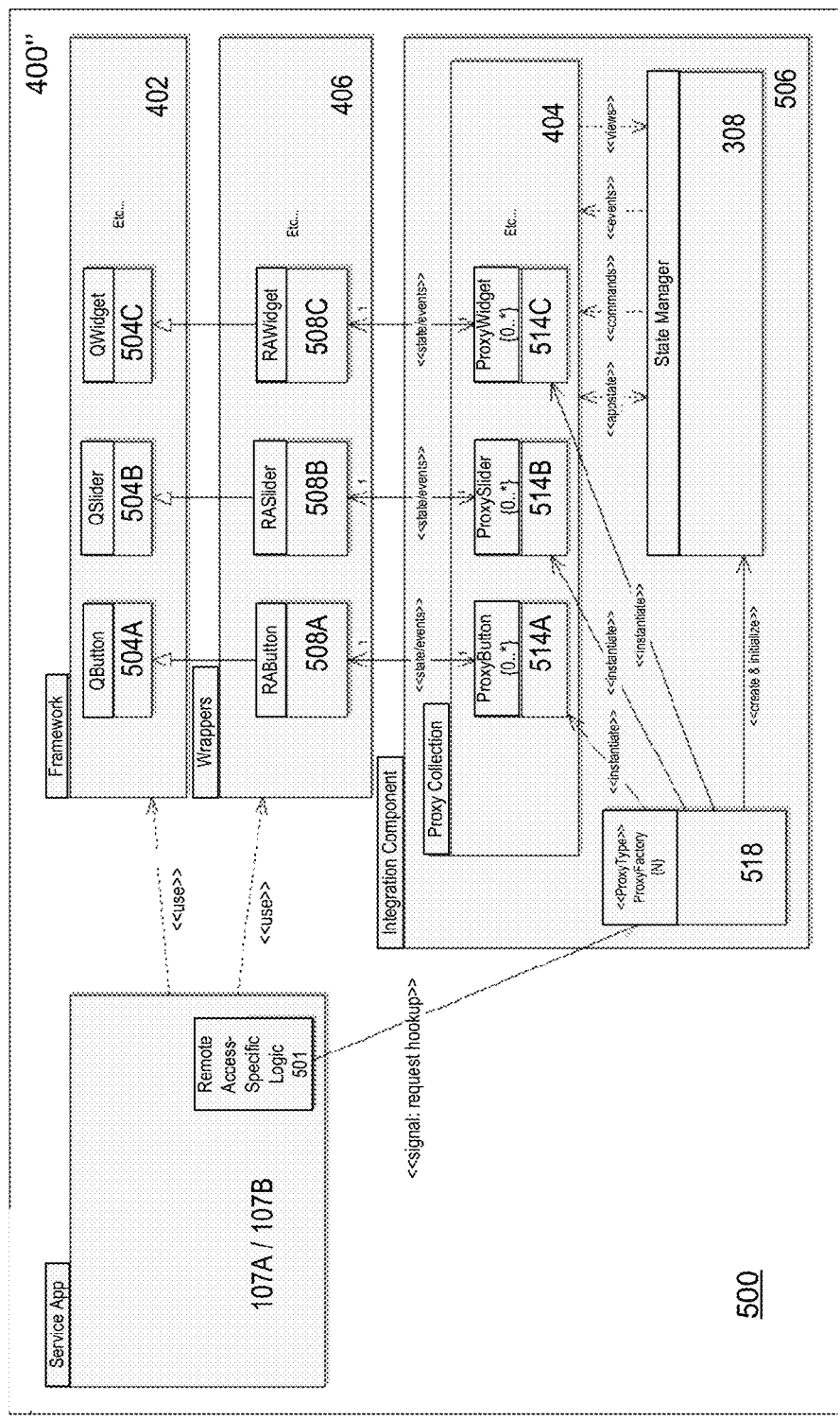
FIGS. 4A and 4B illustrate examples of a service-side architecture for implementing a remote-access architecture within an application framework.

FIG. 4A illustrates a detailed overview of a service-side architecture 400" for implementing a remote-access architecture within an application framework. Specifically, the service-side architecture 400" describes an implementation where Qt is the application framework 402. The Qt-based framework 402 includes libraries of low level controls, such as QButtons 504A, QSliders 504B, QWidgets 504C, etc. The wrapper component 406 accounts for the remote access-rebasing wrapper classes which will inherit the Qt low level controls, e.g., a RAButton 508A, a RASlider 508B, a RAWidget 508C, etc. The wrapper component 406 is a thin wrapper layer of derived classes for relevant low-level Qt controls/widgets.

The wrappers (508A, 508B, 508C) are lightweight derived classes which modify or augment the interfaces of standard Qt or other application framework controls to make them remote-access-ready. As noted above, the wrapper acts as a "tap" to enable a control to be activated by runtime signals as though it was being activated by UI interaction, and to signal state changes and relevant events so those signals can be received by an external slot (e.g., on an integration proxy). Some controls already expose a suitable interface, reducing the wrapper to nothing but a virtual destructor which disconnects the wrapper from any proxy that might be connected. For most common Qt controls an instance of a derived wrapper type can be created such that the rest of the application may reference that instance as though it were an instance of the standard control (i.e., use it as a polymorphic type).

The integration component 506 includes the remote access libraries, shown in the diagram as the StateManager 308. There is also the collection of dynamically constructed proxy classes 404 (ProxyButton 514A, ProxySlider 514B, ProxyWidget 514C, and so on). These proxies 404 are shown to communicate with the wrapper classes 508A, 508B and 508C via signals and slots. Given that signals and slots require no direct method calls and thus do not necessitate the inclusion of headers, this communication is dependency-less. The Integration component 406 consists of a collection of dynamically-created integration proxies which connect app-side objects to the remote access server application 111, a ProxyManager 518, which selects and instantiates proxies, and a remote-access API itself (i.e., the StateManager 308 and associated classes).

A ProxyManager 518 is a creator and instantiator of the proxy instances 514A, 514B and 514C as well as the remote access server application 111 and StateManager 308. The ProxyManager 518 services connection requests from remote-access specific logic 501 in the service application 107, and selects and creates an integration proxy (514A, 514B and 514C) of the appropriate type through, e.g., a templated factory for each request, and adds the integration proxy to the proxy collection 404. Each integration proxy 514A, 514B and 514C establishes the connection between a remote-access-aware control in the service application 107 and the StateManager 308, thus connecting signals/slots and registering views and command/event/appstate handlers as required.

In the above, a unique tap type for the wrappers (508A, 508B, 508C) may be used for each UI control type in every UI/Application framework. As the primary interface point with the remote access server application code, the proxies (514A, 514B, 514C) include remote access headers and link to remote access libraries. As such, the service application code cannot directly include or statically link to any proxy code (static linkage is transitive). This implies a pluggability boundary, i.e., the proxy code may expose a runtime-linkable interface which utilizes only generic data types, so application-side code may communicate with the proxies without incurring any direct dependencies on the remote access server application code. The runtime-linkable interface also implies that the application-side code may elect not to link to the proxies at runtime (e.g., if the Proxy library is absent or not licensed, for instance).

In accordance with aspects of the present disclosure, proxies do not utilize any UI/Application framework-specific data types (i.e., the proxies are shared among all deployments), a large percentage of the framework logic may reside within those shared proxies in order to maximize code reuse. Ideally the proxies should leverage inheritance so that common proxy functionality (e.g., connecting to the state and command managers, managing startup and shutdown of the proxy's connection with the remote access server application 111, etc.) may be inherited by all proxies.

In accordance with other aspects the present disclosure, taps do not inherit from each other, but many taps could benefit from inheritance because they share a great deal of underlying functionality. In addition, this functionality often deals directly with UI framework-specific data types and so it may not be readily encapsulated within the proxy hierarchy. As such, the integration component 506 acts as an intermediate relay layer where complex inherited functionality may be structured efficiently, and UI framework-specific data types may be used freely. For example, all visible UI controls in the Qt framework inherit from QWidget, which contains a 'paintEvent' method. A Tap for any control which inherits from QWidget may override the paintEvent method and use it to render a bitmap image of the control to be used as a view for the remote access server application 111. However, this logic is not inherited from other Taps. To solve this, a line override for paintEvent in any given tap may be implemented, and that override can delegate the call out to the paintEvent handler in the tap's associated relay. That relay contains paintEvent-handling functionality by virtue of inheritance from a RelayView class somewhere in its parent hierarchy. In this way, a functionality like paintEvent may be implemented just once and used for any relevant taps despite their inheritance constraints.

The pluggable runtime-linkable interface between the relays and proxies will now be described. This interface is two-way, supporting calls originating at a tap intended to be executed on the associated proxy, and calls from a proxy intended to be executed on the associated tap. In addition, the interface provides a type-safe way for the proxy library to publish its supported proxy factories such that they can be invoked by the relays. This may be accomplished by publishing (exporting) a proxy interface for each supported type in the proxy library, and exporting a relay interface for each supported type in the tap/relay library. The proxy interface may include a factory for each proxy type to instantiate proxy instances. This approach, while being relatively straightforward, is prone to omissions and type matching errors at runtime rather than compile time.

As a solution, a more symmetrical and type-safe approach may be used by defining a single bridge interface for each associated relay/proxy pair. This interface includes both proxy-destined methods and tap-destined methods, and is implemented by both the relay and the proxy. In the proxy library, a method destined to be executed by a tap is simply implemented as a forwarding method (i.e., calls directly through to the relay, which then invokes the required functionality on its associated Tap). Similarly, in the tap/relay library, a method destined to be executed by a proxy is implemented as a forwarding method which calls directly over to the proxy. By collecting both tap-bound and proxy-bound methods onto a single 'shared' interface, compile-time guarantees are gained as the interface supports the methods that expected, as well as the programmer-oriented benefit of collecting all related interface methods into a single location (i.e., making asymmetries and errors easier to spot). There is also a central location for holding factory interface pointers, which will be null if the proxy library is absent and did not connect to the bridge (i.e. in a deployment scenario without a remote access server application 111). Finally, the bridge component should provide a natural marshalling point allowing managed frameworks like .NET or the Java VM to communicate with the common proxy library implemented in cross-platform unmanaged C++ code. The layered architecture arising from the above is thus very flexible and capable of supporting a wide variety of deployment scenarios.

The service application 107 represents an application as it was before any remote-access functionality was introduced in accordance with the present disclosure. Within the service application 107, there is remote-access-specific code 501, which is added to the service application code. For example, the following may be added:

ProxyManager pmgr(0, a.arguments( ).contains("RemoteAccessServer"));

The above instantiates the instance of the ProxyManager class 518, which will be used throughout the lifespan of the service application 107. For example, if the main application receives a string argument of "Remote Access Server" (or other argument), the ProxyManager 518 will start the remote access server application 111. If this argument is not present, the remote access server application 111 is not started and the service application 107 will run as it did before being remote-access-enabled.

In accordance with aspects of the present disclosure, to associate the service-side controls with the controls provided in the client UI, a naming convention may be used that uniquely identifies each service app UI element so it may be associated with a likewise uniquely-identified client UI element. Some application frameworks, such as Qt, lend themselves well to the establishment of such a convention, as outlined below. Standardized Qt UI builders (QtCreator, QtDesigner) construct a navigable 'visual tree' when they create a UI page (or sub-page, or even nested controls). The elements of that tree are named uniquely at each level of the tree to differentiate siblings, and the names are accessible via the runtime introspection facilities of Qt. This provides for an approach in which a unique identifier for a visual element may be constructed as an hierarchical 'path' consisting of the set of names from the top level parent down to the ultimately contained visual element (concatenated with '/' delimiters). The process of unique ID construction can be automated due to the navigable parent/child links in the hierarchy. This works for both statically constructed visual trees (i.e. as built by QtCreator) and dynamically constructed visual trees built programmatically at runtime. As long as the individual visual elements in the tree are named, and each tree 'root' is uniquely named, the resulting hierarchical paths will uniquely identify controls defined either at UI design time or at run time, and the paths may be used as unique ID's for the controls.

Given that the service UI controls have deterministic structured ID's, it is possible to assign the same ID's to the corresponding controls on the client side UI. This can be done manually or automatically by using a tree-walking approach similar to that used in a Qt visual tree. For example, a Silverlight client has navigable visual trees which may be walked in the same way as a Qt visual tree. If the structure of the client UI corresponds 1:1 to the structure of the service UI (or is a simple subset of the same controls), unique control ID's constructed by walking a Silverlight visual tree will correspond exactly to the ID's constructed by walking the corresponding Qt tree.

Using hierarchically structured control ID's has a benefit in that the 'path' representing the control ID may be used directly as an application state (appstate) path in the state model 200 (FIG. 8), defining a unique location in appstate where we may keep any state related to that control. The nature of the unique ID's guarantees that the state location will not collide with other controls. In addition, the control ID may be used as a 'base name' for any commands a client may issue related to that control. This allows the service to register command handlers for any control automatically, without any special effort on the part of the developer.

Figure 4B:
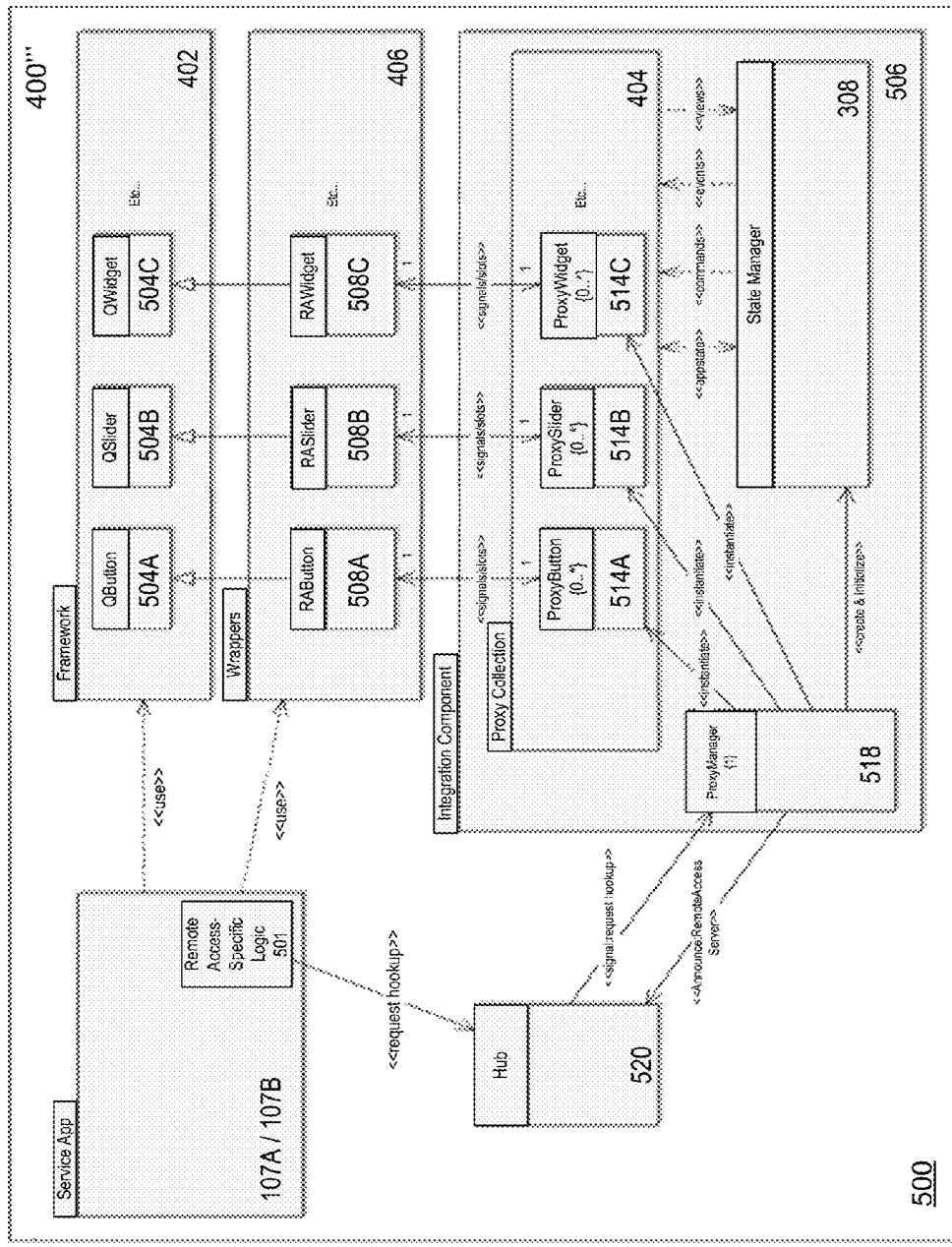

FIG. 4B illustrates a detailed overview of another service-side architecture 400''' for implementing a remote-access architecture within an application framework, such as Qt. The architecture 400''' is similar to the architecture 400''; however, it includes a Hub singleton object 520 that is provided as a connection broker object that facilitates communication between remote-access specific logic 501 in the service application 107 and the Integration component 406. The service application 107 makes direct calls to the Hub singleton 520 to ask for connection of its controls to the remote access server application 111, and the ProxyManager class 518 connects a signal/slot connection between itself and Hub 520 in order to have these proxy connection requests relayed to it. The Hub 520 is available throughout the service application (i.e., it is visible to all components).

Another addition in the environment 400''', which is part of the remote-access-specific code 501 is for example:

HUB→raConnectUIToRemoteAccessServer(this, " ");
scribbleArea→raConnect("RAVScribbleArea");

The first line above is a call to Hub 520 which will find and connect all of the remote-access aware components to proxy handlers in the collection of proxy classes 404. The second line is a connection of the RAWidget scribbleArea to a ProxyWidget handler 514C.

In accordance with the present disclosure, a registration process is provided that assigns RAPushButtons to ProxyPushButtons, RALabels to ProxyLabels, and so on between the Wrapper component 506 and the Integration component 506. The process is implemented by the Hub 520, which has methods that are called to walk the service application's visual tree, find all of the low level controls, and queue a connection request on their behalf to the remote access server application 111. Hub 520 acts as a globally available object that provides methods for finding and queuing connection requests for the remote access controls. The ProxyManager 518, upon its instantiation, starts the remote access server application 111 and connects to the Hub 520 via a signal and slot connection.

Figure 5:
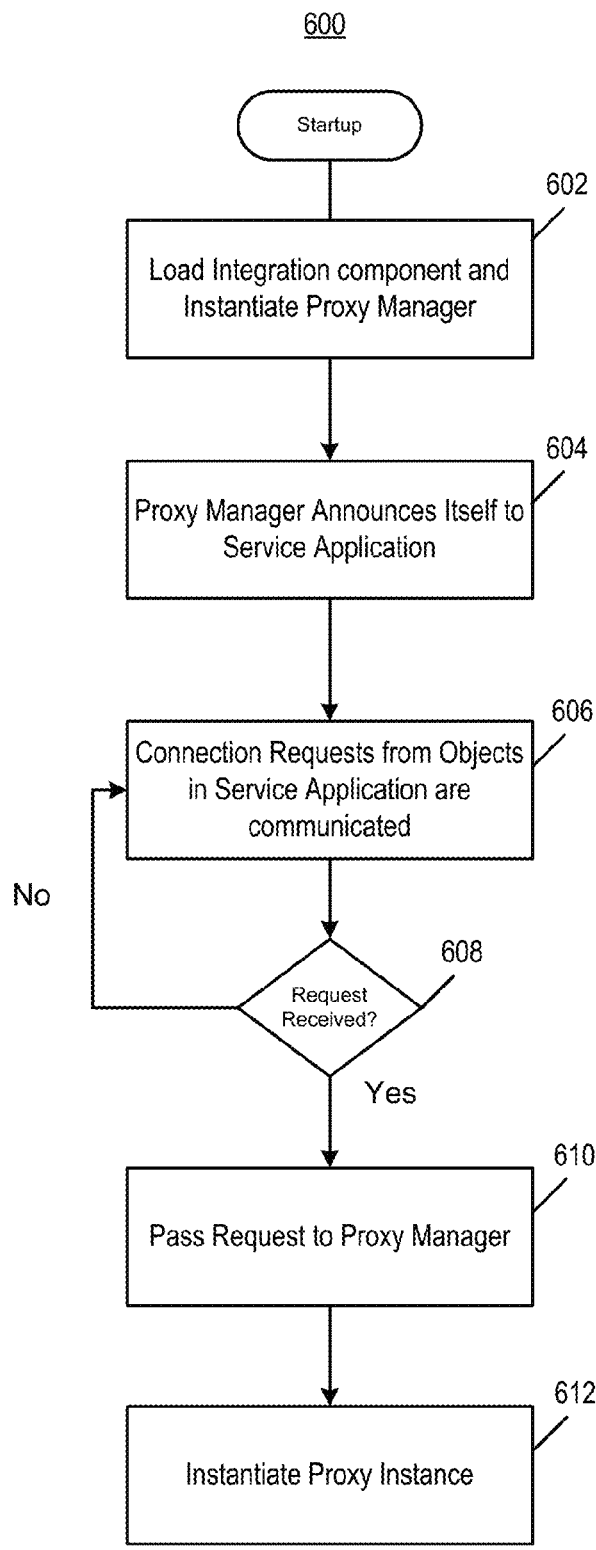
FIG. 5 illustrates an exemplary operational flow of receiving requests from remote-access-enabled objects.

With reference to FIG. 5, there is illustrated an example operational flow 600 of receiving requests from remote-access-enabled objects. During startup, the ProxyManager singleton 518 is instantiated when the integration component 406 is loaded at 602. When the ProxyManager singleton 518 is instantiated, it immediately announces itself to the service application 107 (at 604).

At 606, remote-access-enabled objects in the service application 107 will request connections to the remote access server application 111. At 608, it is determined if a connection request is received. A connection request identifies the object initiating the request (i.e., it passes a QObject pointer to itself), and also supplies 'context' for the request. The context is a structured string which contains the unique identifier for the object/control instance (as described above) and supplies any other information relevant to the connection. At 610, received request are passed to the ProxyManager object 518 in the integration component 406. Based on the connection request, at 612, the ProxyManager 815 instantiates an appropriate integration proxy instance (e.g., one of 514A, 514B, 514C). The proxy instance is initialized based on the connection request (i.e., it receives a pointer to the service-side object to be connected, along with the context information for the connection).

When an integration proxy 514A, 514B, 514C is constructed and initialized, it connects to the application-side object and the remote access server application 111 via the StateManager 308. As such, initialization of an integration proxy 514A, 514B, 514C may also result in connecting command or application state change handlers, creating or modifying application state contents (in the state model 200), and/or registering a view (and corresponding mouse/keyboard event handlers). The lifetime of the integration proxy 514A, 514B, 514C mirrors the lifetime of the corresponding object in the service application 107, making shutdown more robust because even abrupt termination of other components in the service application 107 does not preclude orderly shutdown of integration proxies 514A, 514B, 514C in the integration component 406. In some implementations, the ProxyManager 518 tracks the instantiated proxies 514A, 514B, 514C and can cleanly shut down any stragglers. By providing the interaction logic in the proxy 514A, 514B, 514C, an abstraction layer is created for adapting to any differences in the client-side and server-side controls. An example would be abstracting 'zoom' operations so that they can be initiated via pinch-zoom actions on the client side as opposed to mouse actions operating on a zoom control.

Figure 6:
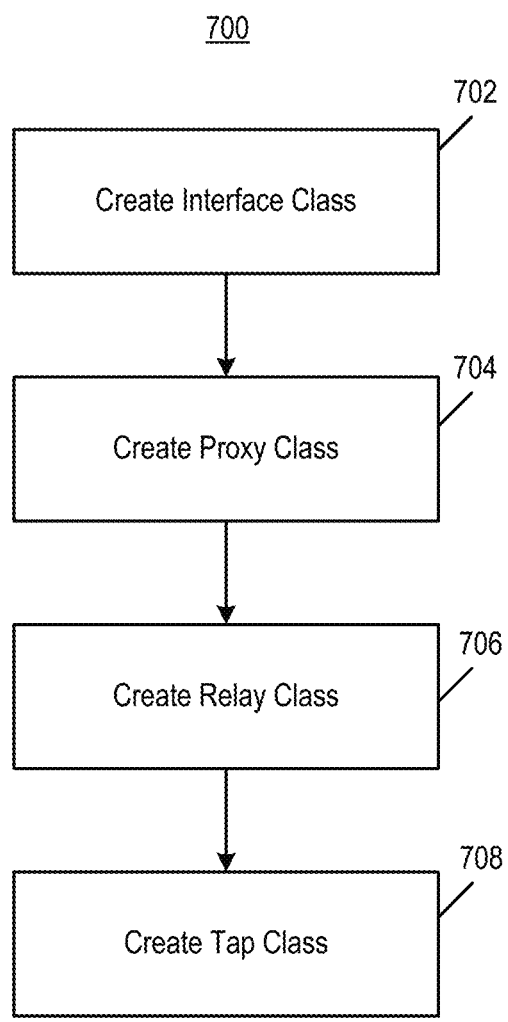
FIG. 6 illustrates an exemplary operational flow diagram of a proxy creation process.

FIG. 6 illustrates an example operational flow 700 of a proxy creation process. At 702, an interface class (IBridge interface class) is created which defines methods to facilitate their communication. The IBridge interface class defines the messages that relays and taps may send to each other. An IBridge template may be used to fill out the header file's contents and to add the specific types of calls to the proxy and taps.

At 704, a Proxy Class is created. The proxy class inherits from the IBridge interface. If a control is of a type that will have to send messages to the service application 107 (e.g., a button needing to send click notifications, a combobox needing to send selected index messages, or a slider sending value messages), this is considered to be a "Two-Way" proxy. Otherwise, if a control can be handled entirely by having the service application 107 sending all information to the remote access server application 111 (e.g., such as a text label, where the only real task of the proxy would be to have a text field set by the service and not require any input from the client), then it is considered it a "One-Way" proxy. Choose your type of proxy and copy-paste the contents of its corresponding proxy header template (One-Way template or Two-Way template). The following steps will assume you have chosen a Two-Way proxy as it will include all method types that a One-Way proxy would have.

At 706, a relay class is created. The relay class is defined in a tap project. For example, a relay is added to a TapsQt project. Here, the methods in the IBridge class are implemented. Also, tap methods are defined to manipulate the tap control as desired. At 308, a tap class is created. New tap classes can be created by adding a new header file. The setter methods are overloaded for each attribute for which the remote access server application 111 maintains awareness.

Thus, the architectures 400', 400" and 400''' remote-access-enable applications built on application frameworks by abstracting all of the communications and messaging away from the application logic. As such, the developers/maintainers of the application do not need specialized knowledge. The architectures provide a very efficient, low-latency pipeline and an abstraction layer for the capture and modelling of input events from mouse and keyboard devices on multiple client platforms and converting them for use with the original application. In addition, the architectures provide a very robust and easy to use mechanism for modelling the state of an application that is independent of platform, communications, and messaging.

Environment Overview

Figure 7:
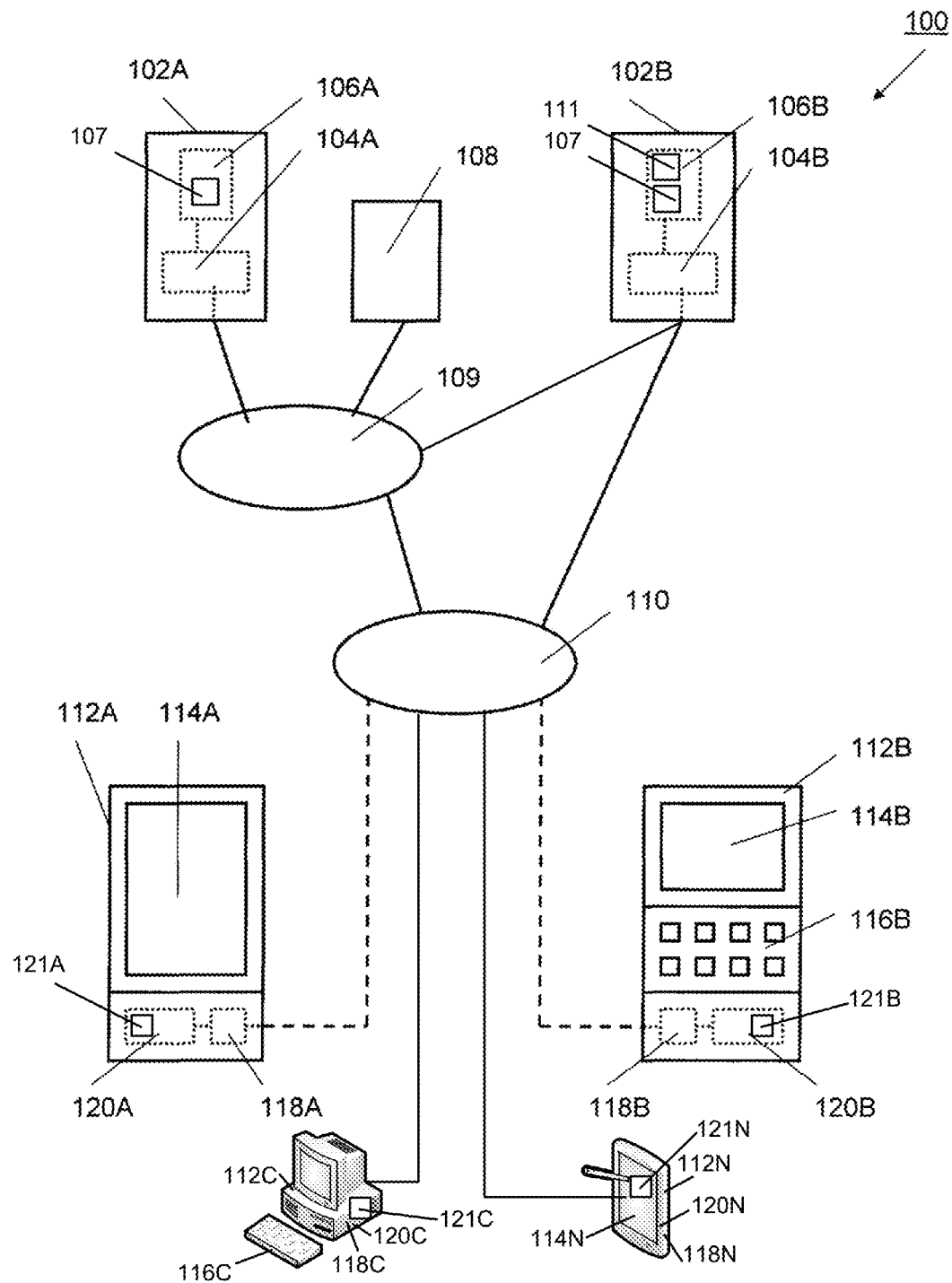
FIG. 7 is a simplified block diagram illustrating an environment in which the present disclosure may be implemented.

Referring to FIG. 7, an example architecture 100 for providing remote access to an application, data or other service via a computer network. The system comprises a client computer 112A or 112B, such as a wireless handheld device such as, for example, an IPHONE, ANDROID, WINDOWS PHONE, or a BLACKBERRY device connected via a computer network 110 such as, for example, the Internet, to a server 102B. Similarly, the client computing devices may also include a desktop/notebook personal computer 112C or a tablet device 112N that are connected by the communication network 110 to the server 102B. It is noted that the connections to the communication network 110 may be any type of connection, for example, Wi-Fi (IEEE 802.11x), WiMax (IEEE 802.16), Ethernet, 3G, 4G, LTE, etc.

The server 102B is connected, for example, via the computer network 110 to a Local Area Network (LAN) 109 or may be directly connected to the computer network 110. For example, the LAN 109 is an internal computer network of an institution such as a hospital, a bank, a large business, or a government department. Optionally, a database 108 may be connected to the LAN 109. Numerous service applications 107 may be stored in memory 106A of the computing device 102A and executed on a processor 104A. Similarly, numerous service applications 107 may be stored in memory 106B of the server 102B and executed on a processor 104B. The service applications 107 may be applications created using Remote-access/Qt widgets, as described below, in order to provide remote access to the service applications 107. The computing device 102A, the server 102B and the client computing devices 112A, 112B, 112C or 112N may be implemented using hardware such as that shown in the general purpose computing device of FIG. 11.

The client remote access application 121A, 121B, 121C, 121N may be designed for providing user interaction for displaying data and/or imagery in a human comprehensible fashion and for determining user input data in dependence upon received user instructions for interacting with the service application using, for example, a graphical display with touch-screen 114A or a graphical display 114B/114N and a keyboard 116B/116C of the client computing devices 112A, 112B, 112C, 112N, respectively. For example, the client remote access application is performed by executing executable commands on processor 118A, 118B, 118C, 118N with the commands being stored in memory 120A, 120B, 120C, 120N of the client computer 112A, 112B, 112C, 112N, respectively.

Alternatively or additionally, a user interface program is executed on the server 102B that is then accessed via an URL by a generic client application such as, for example, a web browser executed on the client computer 112A, 112B. The user interface is implemented using, for example, Hyper Text Markup Language HTML 5.

The operation of the remote access server application 111 with the client remote access application (any of 121A, 121B, 121C, 121N, or one of service applications 107) is performed in cooperation with a state model 200, as illustrated in FIG. 8. When executed, the client remote access application updates the state model 200 in accordance with user input data received from a user interface program. The remote access application may generate control data in accordance with the updated state model 200, and provide the same to the remote access server application 111 running on the server 102B.

Upon receipt of application data from the service application 107, the remote access server application 111 updates the state model 200 in accordance with the screen or application data, generates presentation data in accordance with the updated state model 200, and provides the same to the client remote access application 121A, 121B, 121C, 121N on the client computing device. The state model 200 is determined such that each of the logical elements of the service application 107 is associated with a widget and/or user interactions. For example, the logical elements of the service application are determined such that the logical elements comprise transition elements with each transition element relating a change of the state model 200 to one of control data and application representation data associated therewith.

The state model 200 may be represented in, e.g., an Extensible Markup Language (XML) document. Other representations of the state model are possible. The state model 200 may define the service application 107 according to their containment structures. For example, consider the case in which the service application 107 has a main page with several nested (but nameable) windows and tab controls. Any element in the service application 107 can have the root path of "/MainPage", followed by either a particular controls name, or each nested containment view necessary to uniquely identify that control. For example, consider a main page that contains a window that has three selected tabs and a named "OpenButton" that is contained within the second tab, labeled "Buttons". In this example, the application state path for that particular button control would be "/MainPage/ButtonsTab/OpenButton". As many intermediary views as necessary may be added to uniquely identify a particular control.

If the service application 107 does not contain a main page but instead contains several workflows from which to operate, the root application state path may be set to the name of the workflows. For example, consider a login page which, after logging in, moves to a "home" page. Also, from the home page, a user can choose to move to several other pages, all of which cannot be said to be contained within a "root" page. In this case, the application state path can be constructed with its root as the current page: "/LoginPage/LoginButton" for a login button, "/HomePage/IntroductionText" for an introductory written text message on the home page, "/AboutMePage/ContactMeButton" for a contact button on an "About Me" page, and so forth. In this fashion every control is uniquely identifiable.

After a particular low-level control (e.g. a button) has been identified, descriptive traits may be appended to the end of that button's state path to identify its current state. For instance, a "/Text" entry may be appended which contains the button's text contents, a "/isEnabled" entry which contains a Boolean as to whether or not the button is currently enabled, an "/isVisible" entry for defining the button's visibility status. Any number of descriptive traits may be provided. The same traits may be added to every instance of a particular control type entered into the application state in the state model 200 in order to precisely describe the service application's state to connected client applications. Methods of how to perform the above are described with reference to FIGS. 5-8.

In some implementations, two or more of the client computing devices 112A, 112B, 112C . . . 112N and/or the server 102B may collaboratively interact with the service application 107. As such, by communicating state information between each of the client computing devices 112A, 112B, 112C . . . 112N and/or the server 102B and/or the computing device 102A participating in a collaborative session, each of the participating client computing devices 112A, 112B, 112C . . . 112N may present a synchronized view of the display of the service application 107.

FIG. 9 illustrates aspects of a distributed system within the environment of FIGS. 7 and 8. The system may have a tiered infrastructure where a client tier 320 and a server tier 330 communicate information, data, messages, etc., between each other. The server tier 330, in turn, communicates the information, data, messages, etc., with an application tier 340. Thus, the server tier 330 may serve as a proxy between the client tier 320 and the application tier 340 during a session between a client (in the client tier 320) and the service application (e.g., 107 in the application tier 340). In FIG. 9, the service application 107 may be an "unmanaged" service meaning that the life-cycle of the service application 107 is not controlled by remote access server application 111 in the server tier 330.

The client remote access application 121A, 121B, 121C, 121N may sit on top of client libraries 304 in a client tier 320. The client libraries 304 may be specific or independent of the platform of the client computing device. The client tier 320 communicates to the remote access server application 111 in a server tier 330. The server tier 330 communicates to a state manager 308 sitting on top of the service applications 107 and remote access logic 312 in an application tier 340. The state model 200 is communicated among the tiers and may be modified in any of the tiers by the client remote access applications 121A . . . 121N, the remote access server application 111, and the service applications 107 to update create session information contained therein.

In some implementations, the application tier and server tier may be implemented within a cloud computing environment to provide remote access to the service applications 107. Cloud computing is a model for enabling network access to a shared pool of configurable computing resources (e.g., networks, servers, storage, applications, and services) that can be provisioned and released with minimal interaction. The cloud computing model promotes high availability, on-demand self-services, broad network access, resource pooling and rapid elasticity. In such an environment, the service applications 107 may be accessed by the client computing devices 112A, 112B, 112C or 112N through a client interface, such as a client remote access application 121A, 121B, 121C, 121N, as described below.

In yet other implementations, the architecture 100 may be implemented using micro-services such that functionalities of, e.g., the remote access server application 111, the state manager 308, and remote access logic 312 are independently deployable services on one or more servers. Such an implementation may provide for fault tolerance and scalability. For example, proxying of requests/responses, service management, scheduling, service discovery and configuration, and API management may be deployed as separate microservices within such an architecture.

Figure 10:
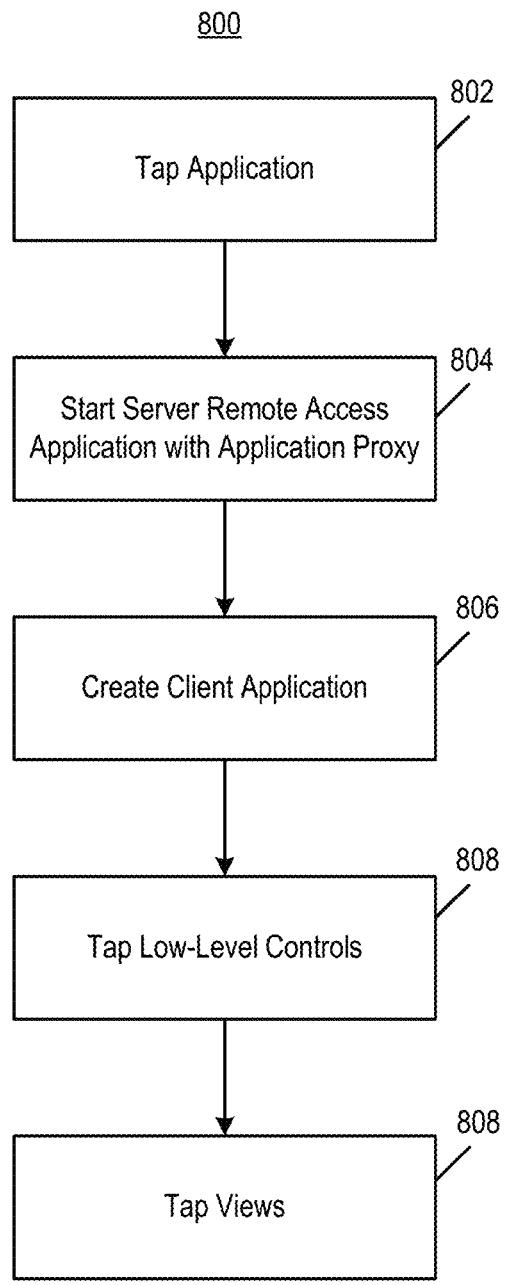
FIG. 10 illustrates an exemplary operational flow diagram to of remote-access enabling an application developed within an application framework.

FIG. 10 illustrates an example operational flow 800 of remote-access enabling a Qt application. After an understanding of how the Qt application works is developed, at 802, the application is tapped. At 804, the remote access server application 111 is started to connect the service application 107 with a client remote access application 121A . . . 121N. For example, in main.cpp, the QApplication object is declared and replace with Tap_QApplication. The remote access server application 111 is started by Tap_QApplication's proxy. At 806, a client application is created. The client application is used to connect to the service application as it has been named above.

At 808, the low-level controls are tapped. For example, instances of QControl with are replaced with a corresponding Tap_QControl class. At 810, the views are tapped. For example, in a Qt application, every control which is visible in the application eventually inherits from "QWidget." Thus, to remote-access enable QWidget as a view, "QWidget" may be replaced with "Tap_QWidgetView." A view is given an object name (via the control.setObjectName("Name")) call in order to actually register the view with the remote access server application 111.

Thus, as described above, the present disclosure details an architecture that enables a Qt or other application framework-based application to be remote-access enabled.

Figure 11:
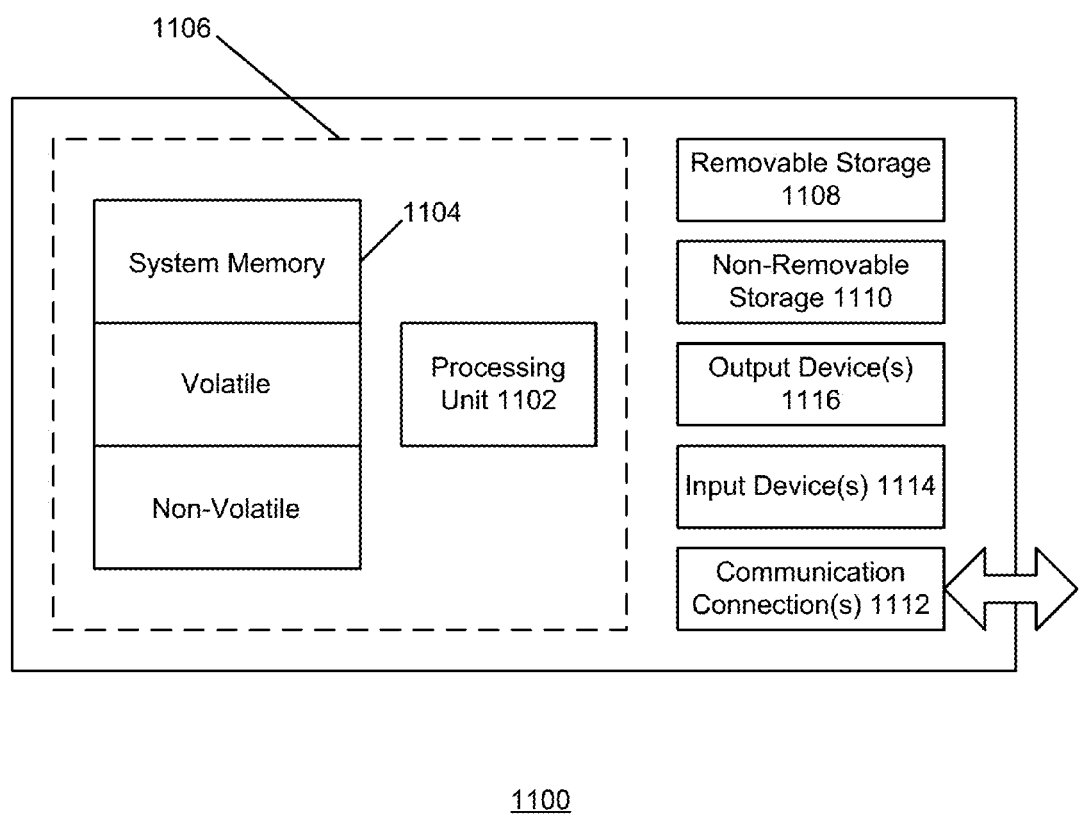
FIG. 11 illustrates an exemplary computing device.

FIG. 11 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 11, an exemplary system for implementing aspects described herein includes a computing device, such as computing device 1100. In its most basic configuration, computing device 1100 typically includes at least one processing unit 1102 and memory 1104. Depending on the exact configuration and type of computing device, memory 1104 may be volatile (such as random access memory (RAM)), non-volatile (such as read-only memory (ROM), flash memory, etc.), or some combination of the two. This most basic configuration is illustrated in FIG. 11 by dashed line 1106.

Computing device 1100 may have additional features/functionality. For example, computing device 1100 may include additional storage (removable and/or non-removable) including, but not limited to, magnetic or optical disks or tape. Such additional storage is illustrated in FIG. 11 by removable storage 1108 and non-removable storage 1110.

Computing device 1100 typically includes a variety of tangible computer readable media. Computer readable media can be any available media that can be accessed by device 1100 and includes both volatile and non-volatile media, removable and non-removable media.

Computer storage media include tangible volatile and non-volatile, and removable and non-removable media implemented in any method or technology for storage of information such as computer readable instructions, data structures, program modules or other data. Memory 1104, removable storage 1108, and non-removable storage 1110 are all examples of computer storage media. Computer storage media include, but are not limited to tangible media such as RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media may be part of computing device 1100.

Computing device 1100 may contain communications connection(s) 1112 that allow the device to communicate with other devices. Computing device 1100 may also have input device(s) 1114 such as a keyboard, mouse, pen, voice input device, touch input device, etc. Output device(s) 1116 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device.

One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of providing remote access to a service application within in an application framework executing on a server, comprising:
   providing wrappers that each correspond to a user interface element of the application framework, each wrapper modifying an interface of a respective user interface element to enable remote-access to the respective user interface element;
   providing an integration component that includes proxies that communicate to the wrappers, a proxy manager that communicates to the service application, and a state manager that registers views and event handlers to communicate application state information that associates user-interface elements with logical elements of the service application;

starting a remote access server application on a remote access server in accordance with an identifier provided by the proxy manager to enable remote access to the service application;

receiving a connection from a client remote access application executing on a client device; and communicating application state information between the service application and the client remote access application to provide a view of the service application at the client device.

2. The method of claim 1, wherein each wrapper comprises a derived class that inherits properties from its respective low level control.

3. The method of claim 1, further comprising providing a pluggable boundary between the proxies and the service application, such that the service application does not link to the proxies.

4. The method of claim 1, further comprising announcing to the service application that the proxy manager has been instantiated and ready to receive requests from objects associated with the service application.

5. The method of claim 4, further comprising:
receiving a request, at the proxy manager, from an object; and
instantiating a proxy instance associated with the object to service the request.

6. The method of claim 5, wherein the requests are directed to the remote access server application.

7. The method of claim 5, wherein a lifetime of the proxy instance is the same as the object.

8. A method of receiving requests from remote access-enable enabled user interface elements associated with a at a remote access-enabled service application within in an application framework executing on a server, comprising:
providing wrappers that each correspond to a user interface element of the application framework, each wrapper modifying an interface of a respective user interface element to enable remote-access to the respective user interface element;
providing an integration component that includes proxies that communicate to the wrappers, a proxy manager that communicates to the service application, and a state manager that registers views and event handlers to communicate application state information that associates user-interface elements with logical elements of the service application;
starting a remote access server application on a remote access server;
receiving a connection request at the remote access server from a remote-access enabled user interface element;
instantiating an integration proxy in response to the connection request being received to communicate state information between the user interface elements and the remote access server.

9. The method of claim 8, further comprising receiving, at the service application, an announcement from the proxy manager indicating that the proxy manager has been instantiated.

10. The method of claim 8, further wherein the connection request identifies an object initiating the request and includes a context for the connection request.

11. The method of claim 10, wherein the context is a structured string which contains a unique identifier of the user interface element.

12. The method of claim 8, further comprising further comprising:
connecting the integration proxy to the user interface element and the remote access server application.

13. The method of claim 8, wherein the integration proxy is connected to the user interface element and the remote access server application using a state manager, the method further comprising creating or modifying application state contents or a registering a view associated with the service application.

14. A non-transitory computer-readable medium comprising computer-executable instructions that when executed by a computing device cause the computing device to perform a method of providing remote access to a service application within in an application framework executing on a server, comprising:
providing wrappers that each correspond to a user interface element of the application framework, each wrapper modifying an interface of a respective user interface element to enable remote-access to the respective user interface element;
providing an integration component that includes proxies that communicate to the wrappers, a proxy manager that communicates to the service application, and a state manager that registers views and event handlers to communicate application state information that associates user-interface elements with logical elements of the service application;
starting a remote access server application on a remote access server in accordance with an identifier provided by the proxy manager to enable remote access to the service application;
receiving a connection from a client remote access application executing on a client device; and
communicating application state information between the service application and the client remote access application to provide a view of the service application at the client device.

15. The non-transitory computer-readable medium of claim 14, wherein each wrapper comprises a derived class that inherits properties from its respective low level control.

16. The non-transitory computer-readable medium of claim 14, further comprising instructions for providing a pluggable boundary between the proxies and the service application, such that the service application does not link to the proxies.

17. The non-transitory computer-readable medium of claim 14, further comprising instructions for announcing to the service application that the proxy manager has been instantiated and ready to receive requests from objects associated with the service application.

18. The non-transitory computer-readable medium of claim 17, further comprising instructions for:
receiving a request, at the proxy manager, from an object; and
instantiating a proxy instance associated with the object to service the request.

19. The non-transitory computer-readable medium of claim 18, wherein the requests are directed to the remote access server application.

20. The non-transitory computer-readable medium of claim 18, wherein a lifetime of the proxy instance is the same as the object.

* * * * *